(12) United States Patent
Horton

(10) Patent No.: US 6,948,593 B2
(45) Date of Patent: Sep. 27, 2005

(54) WHEEL CHOCK

(76) Inventor: Steven K. Horton, 204 Alex Stephens Rd., Moreland, GA (US) 30259

( * ) Notice: Subject to any disclaimer, the term of this patent is extended or adjusted under 35 U.S.C. 154(b) by 7 days.

(21) Appl. No.: 10/640,585

(22) Filed: Aug. 13, 2003

(65) Prior Publication Data

US 2005/0034934 A1 Feb. 17, 2005

(51) Int. Cl.$^7$ ............................................... B61H 13/00
(52) U.S. Cl. ....................... 188/36; 188/4 R; D12/217
(58) Field of Search ................ 188/32, 4 R, 5, 188/37, 36; D12/217; 410/30, 42, 49

(56) References Cited

U.S. PATENT DOCUMENTS

| | | | |
|---|---|---|---|
| 2,475,111 A | * | 7/1949 | Ridland ........................ 188/32 |
| 2,822,063 A | * | 2/1958 | Hampton ...................... 188/32 |
| 2,858,906 A | * | 11/1958 | Minick .......................... 188/32 |
| 3,120,292 A | * | 2/1964 | Rambat ........................ 188/32 |
| 4,649,724 A | * | 3/1987 | Raine ........................... 188/32 |
| 4,653,967 A | * | 3/1987 | Isaksson et al. .............. 410/49 |
| 5,427,210 A | | 6/1995 | Willaford |
| D385,526 S | | 10/1997 | Hinkle |
| D387,323 S | | 12/1997 | Wilcox |
| D409,554 S | | 5/1999 | Henry |
| D410,887 S | | 6/1999 | Henry |
| 5,913,389 A | | 6/1999 | Clark |
| D415,463 S | | 10/1999 | Henry |
| 6,336,527 B1 | | 1/2002 | Metz |
| 6,357,987 B1 | | 3/2002 | Palus |
| 6,371,253 B1 | | 4/2002 | Berends et al. |
| 6,390,245 B1 | | 5/2002 | Metz |
| 6,425,465 B1 | | 7/2002 | Tallman et al. |
| 6,467,586 B2 | | 10/2002 | Agtuca |
| 6,478,525 B2 | | 11/2002 | Hageman et al. |
| 2001/0040073 A1 | | 11/2001 | Agtuca |
| 2002/0005321 A1 | | 1/2002 | Agtuca |

* cited by examiner

Primary Examiner—Melanie Torres
(74) Attorney, Agent, or Firm—Womble Carlyle Sandridge & Rice, PLLC

(57) ABSTRACT

A self-tightening wheel chock is disclosed for vehicles, such as light aircraft, that can be easily installed and easily removed. The wheel chock can be affixed to a wheel of the vehicle for retention thereof, is weather resistant and lightweight, and will provide a simple, yet reliable, system for protecting parked vehicles such as light aircraft from buffeting by wind or backwash.

23 Claims, 13 Drawing Sheets

WHEEL CHOCK

FIELD OF THE INVENTION

This invention generally relates to a wheel chock for aircraft, and, more particularly, to a self-tightening wheel chock device that will maintain intimate contact with retained aircraft wheels while the aircraft is parked.

DESCRIPTION OF THE BACKGROUND ART

Wheel chocks are blocks or other impediments that are used against one or more wheels of a parked vehicle to restrict unwanted movement of the vehicle. In a typical scenario, wheel chocks are used to restrain movement of small aircraft when parked. Since small aircraft are typically rather light weight and often do not have parking brake systems, when parked, such aircraft are especially susceptible to wind gusts and to the buffeting of winds created by other propeller or turboprop aircraft or by jet airplanes.

Prior art wheel chocks have attempted to solve these problems. For example, Design Patents: D385,526, D387,323, D410,887, D415,463, and D409,554 feature wedge shaped block designs, while other wheel chock systems have used wire-ropes or other securing devices attached to the chocks, such as disclosed in U.S. Pat. No. 6,467,586, U.S. patent application Publication No. US2001/0040073A1, and U.S. patent application Publication No. US2002/0005321A1. However, the buffeting of parked light aircraft by strong gusts of wind or by the backwash of propellers/turboprops/jet airplanes often can dislodge traditional wedge shaped chocks. Additionally, several of the designs mentioned above can be cumbersome and difficult to install.

Accordingly, it can be seen that a need exists for a wheel chock device for vehicles that addresses the foregoing and other related and unrelated problems in the art.

SUMMARY OF THE INVENTION

A self-tightening wheel chock device is provided for vehicles such as light aircraft and is generally adapted to be easily installed and removed from either the nose wheel or the wing wheels. The wheel chock will maintain intimate contact with a retained aircraft wheel while the plane is being buffeted by wind or backwash. The wheel chock further is weather resistant and lightweight to provide a simple and efficient, yet reliable, system for protecting parked aircraft from unwanted movement resulting from buffeting of the aircraft by wind, prop or jet wash, etc.

One embodiment of the wheel chock includes a first, slotted housing, a second, pegged housing, a leading brace and a trailing brace for securing a tire of the vehicle. The leading brace is connected to the pegged housing and the trailing brace is connected to the slotted housing with the leading and trailing braces further being connected to each other by a tension element. The tension element causes the slotted housing and the pegged housing to be moved from a compression or engaging position with a peg received in the slot of the slotted housing to an extended or disengaging position with the peg positioned exteriorly of the slot.

Another embodiment of the wheel chock includes pull ropes to engage and disengage a latch element. The latch element pivots about a pivot pin to be inserted into a slot and is held against a latch stop for retention thereof.

DETAILED DESCRIPTION OF THE INVENTION

Figure 1:
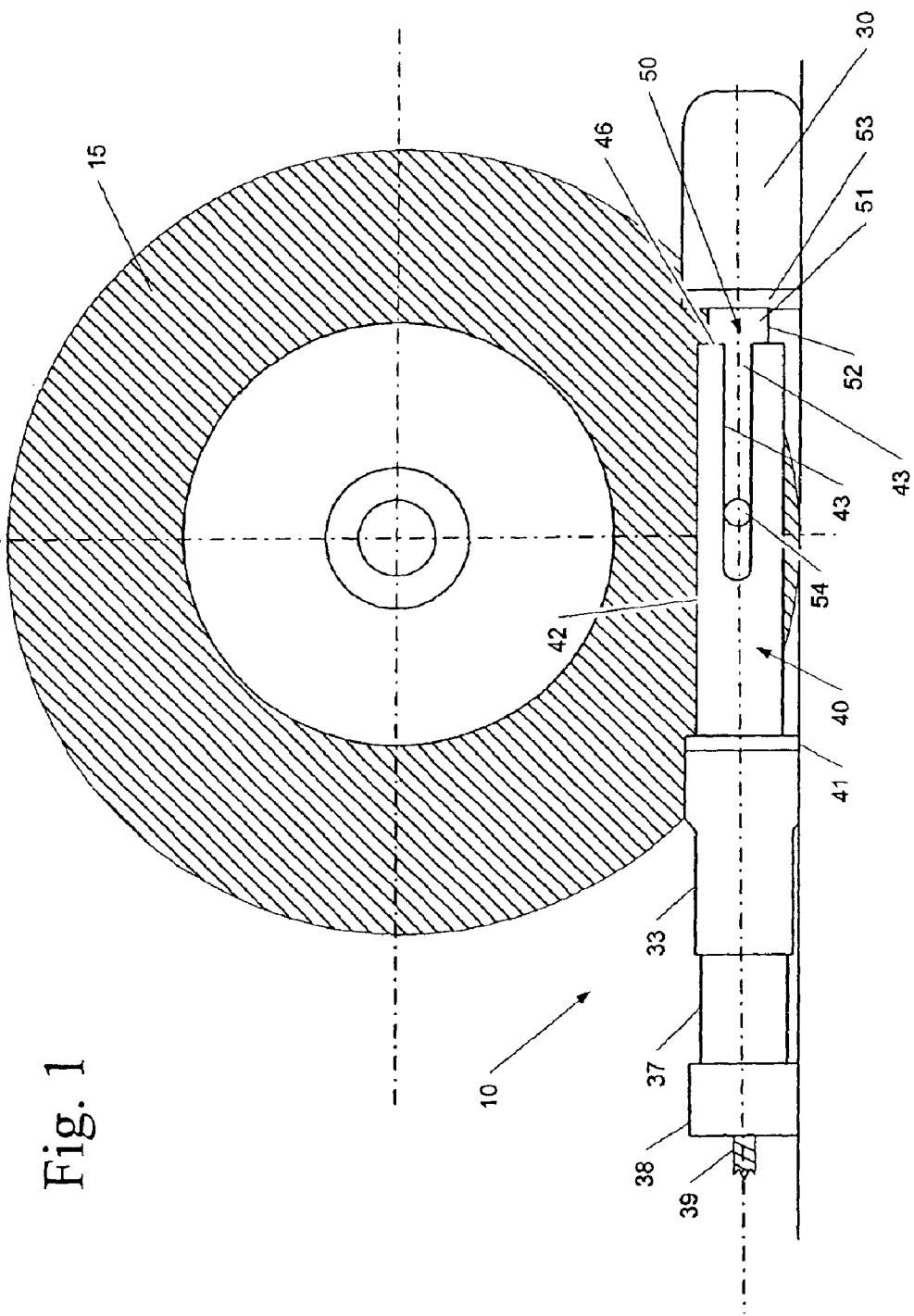
FIG. 1 is a side elevational view of a first embodiment of the wheel chock of the present invention in the engaged position.
Figure 2:
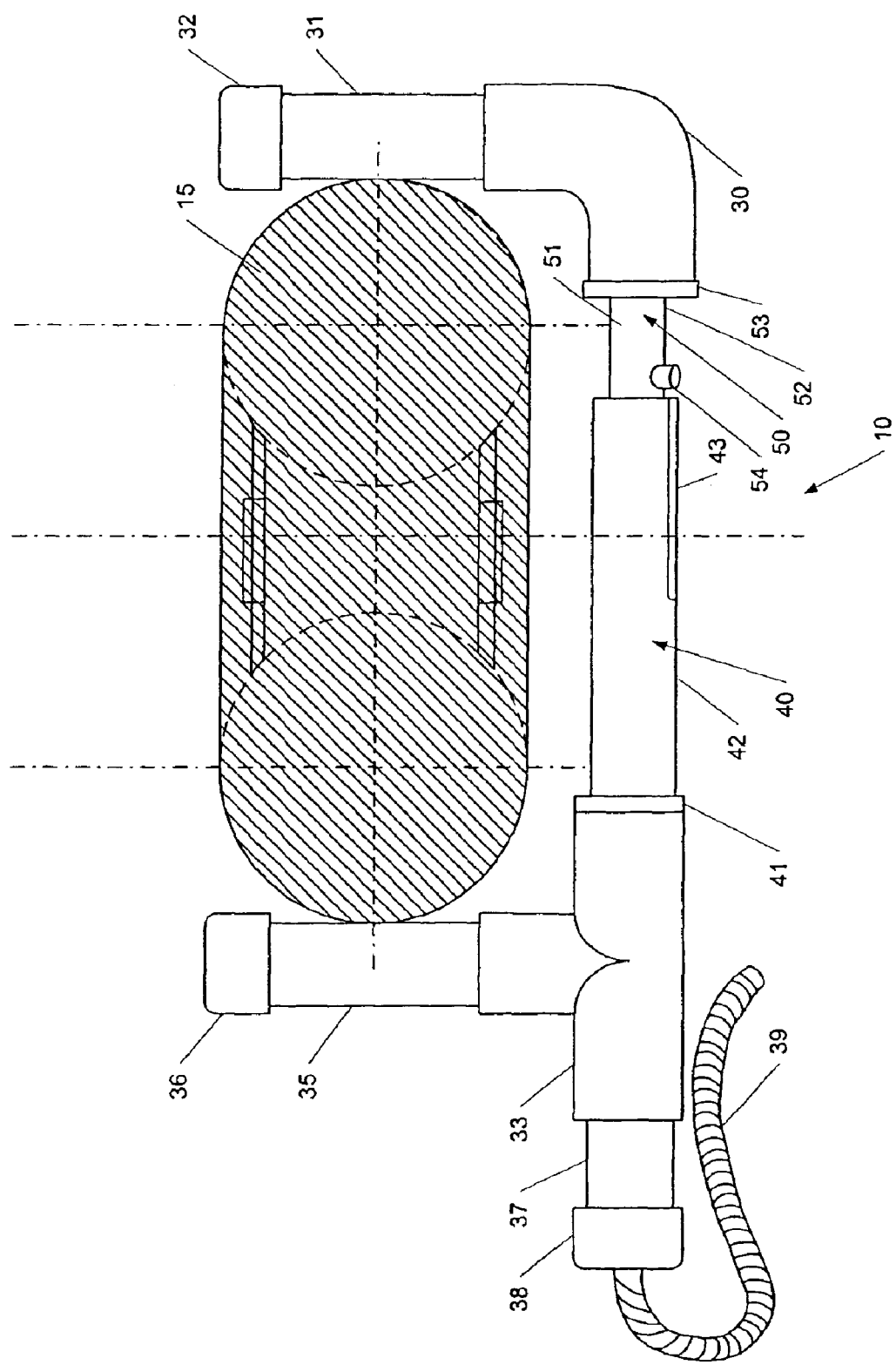
FIG. 2 is a plan view of the wheel chock in the engaged position.

Referring now to the drawings in which like numerals indicate like parts throughout the several views, FIGS. 1 and 2 disclose in a first embodiment a wheel chock 10 in an engaged position around a wheel 15 of an aircraft (not shown). The wheel chock 10 is shown assembled with a first, slotted housing 40 coupled to a second, pegged housing 50. With additional reference to FIGS. 3–5, which illustrate further detail of the locking sub-assembly 20 for securing the wheel chock 10 shown in FIGS. 1 and 2, the locking sub-assembly 20 generally includes the slotted housing 40 and pegged housing 50, slidingly coupled together under the biasing influence of a tension element 21. The tension element 21 is retained at its opposite ends within the housings with tension mounts 22. Each tension mount 22 generally is fixedly held within the sealed ends of the slotted housing 40 and pegged housing 50.

Figure 5:
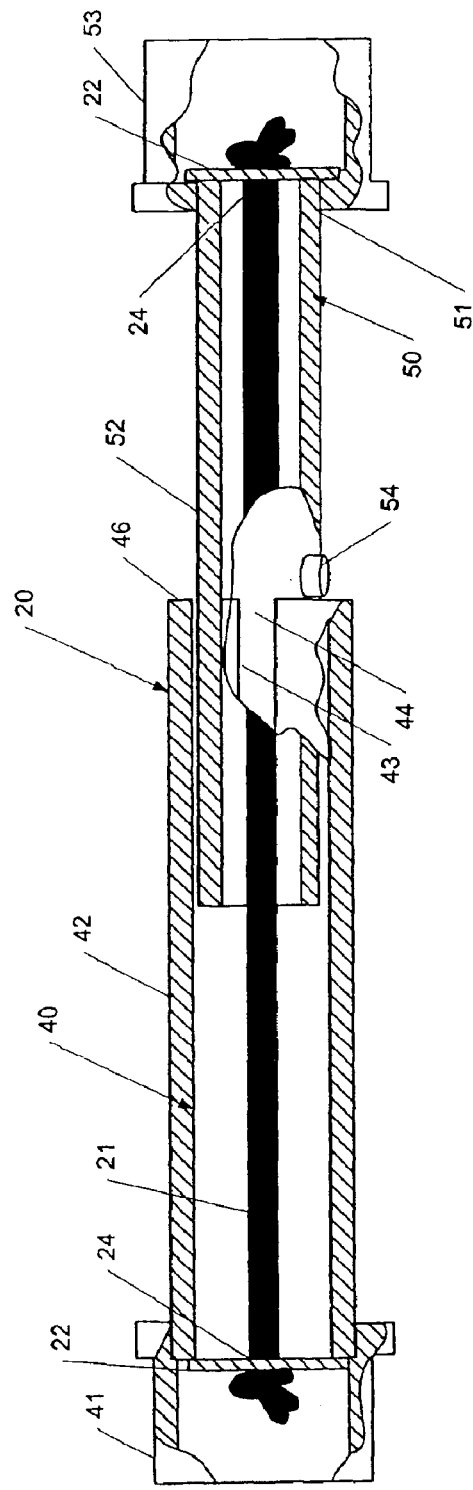
FIG. 5 is a cross-sectional view of the coupled slotted and pegged housings and tension element.
Figure 6:
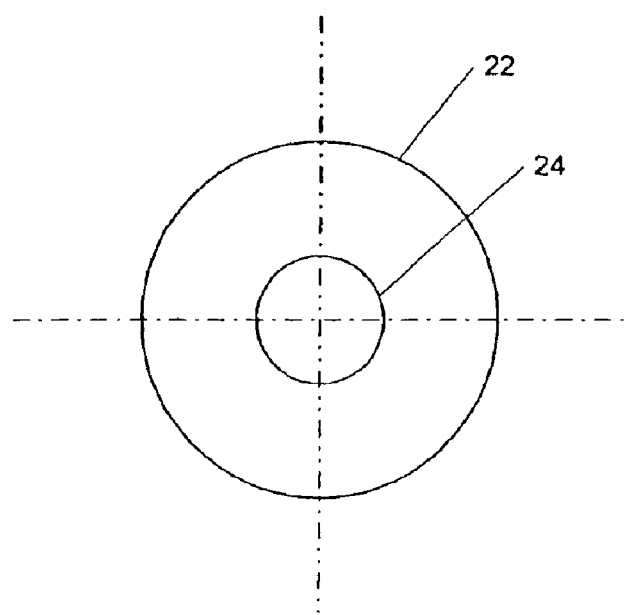
FIG. 6 is an end view of an example tension mount for anchoring the tension element.

The tension element 21 typically utilizes a mechanism or substance that will allow repeated linear expansion and contraction, such as being a band or strip formed from an elastic material, such as rubber or similar material, a tension spring, or can include a pneumatic cylinder, or other mechanically operable system or device for drawing or securing the slotted and pegged housings together. For example, as shown in the embodiment of FIG. 5, the tension element 21 passes through a tensioner hole 24 formed in each of the tension mounts 22 (FIG. 6), which are positioned at the ends of the slotted and pegged housings, and are knotted or otherwise fastened to secure them to the tension mounts. Additionally, any other suitable securing method can be utilized depending upon the material used to form the tension element 21; especially if the tension element is comprised of a spring or other resilient, elastic element as described above.

Figure 12:
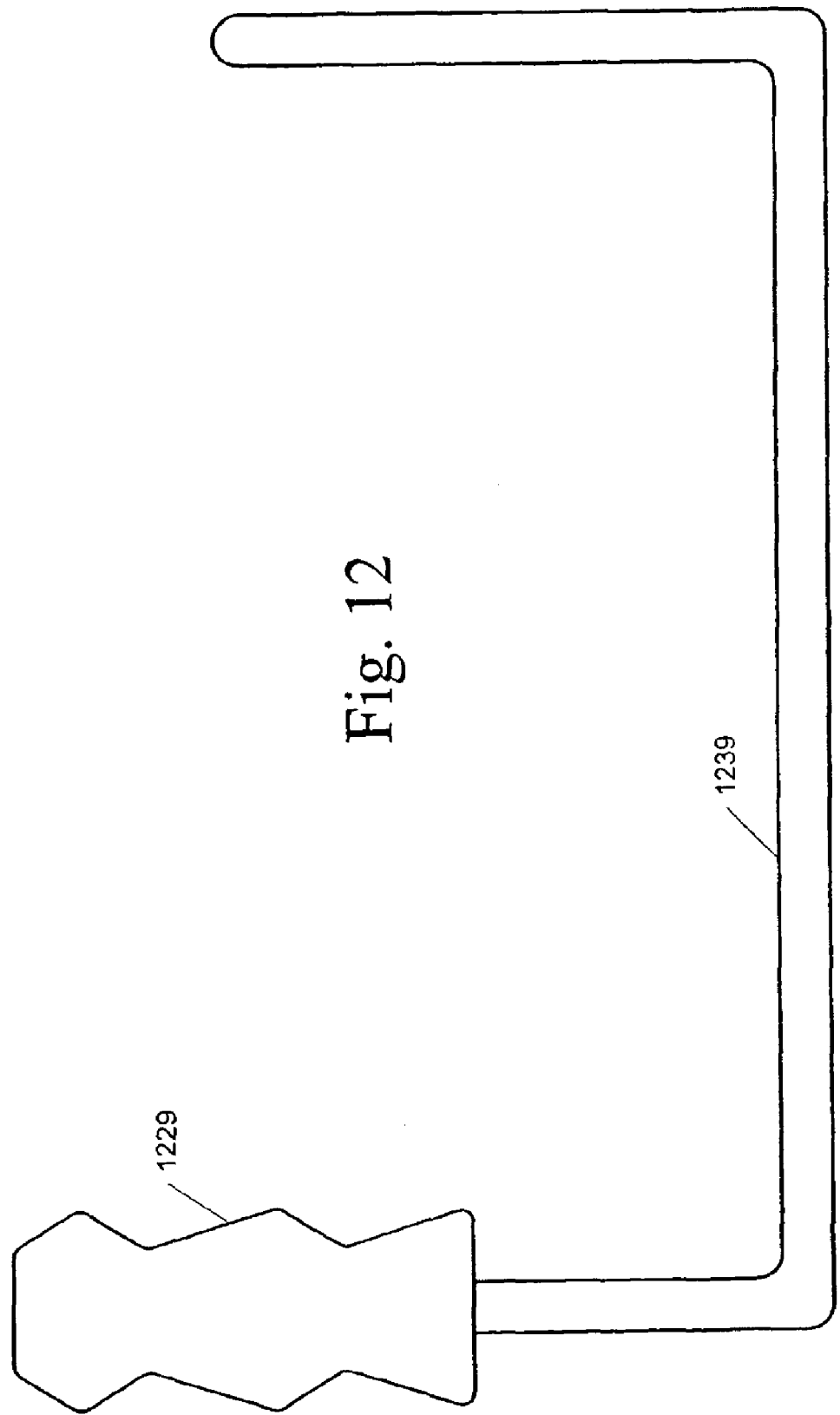
FIG. 12 is a view of a rigid chock placement arm.

As shown in FIG. 2, the wheel chock 10 includes a leading elbow 30, a leading stop brace 31, a leading end cap 32, a T-extension 33, a trailing stop brace 35, and a trailing end cap 36. The leading stop brace 31 functions to secure the leading surface of the wheel 15, while the trailing stop brace 35 functions to brace the wheel's trailing edge. In order to facilitate the placement of the wheel chock 10 under the wheels, the T-extension 33 further can include an extension section or member 37 having an extension end cap 38. The extension member 37 provides additional length to help increase the reach or spacing between the leading and trailing stop braces of the wheel chock 10 to assist the application of the wheel chock 10 to larger and/or difficult to reach wheels. As shown in FIGS. 1 and 2, an extension pull 39 further generally is provided extending from the extension end cap 38. The extension pull 39 can include a rope, cord, band or other flexible or rigid member adapted to be grasped by the user to extend wheel chock 10 and to facilitate release and removal of the wheel chock from an airplane wheel by placing the wheel chock 10 in its extended, release mode or nonengaging position to release its grip on the wheel 15. Alternatively, as shown in FIG. 12, a rigid placement/removal arm 1239 with handle 1229 could be used in place of the extension pull 39 and can provide an additional extension to facilitate release and removal of the wheel chock from an airplane wheel by placing the wheel chock 10 in its nonengaged position to release its grip on the wheel 15 or to facilitate placement of the wheel chock 10 in its engaged position to apply grip to the wheel 15.

Figure 3:
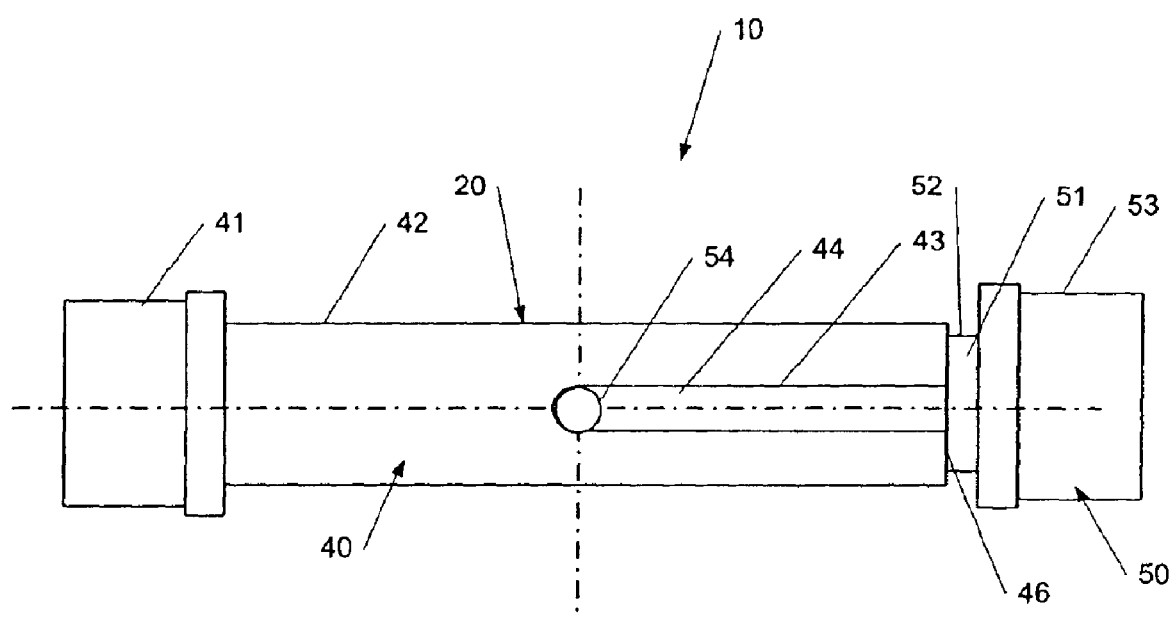
FIG. 3 is a plan view of the coupled slotted and pegged housings in a compressed mode.
Figure 4:
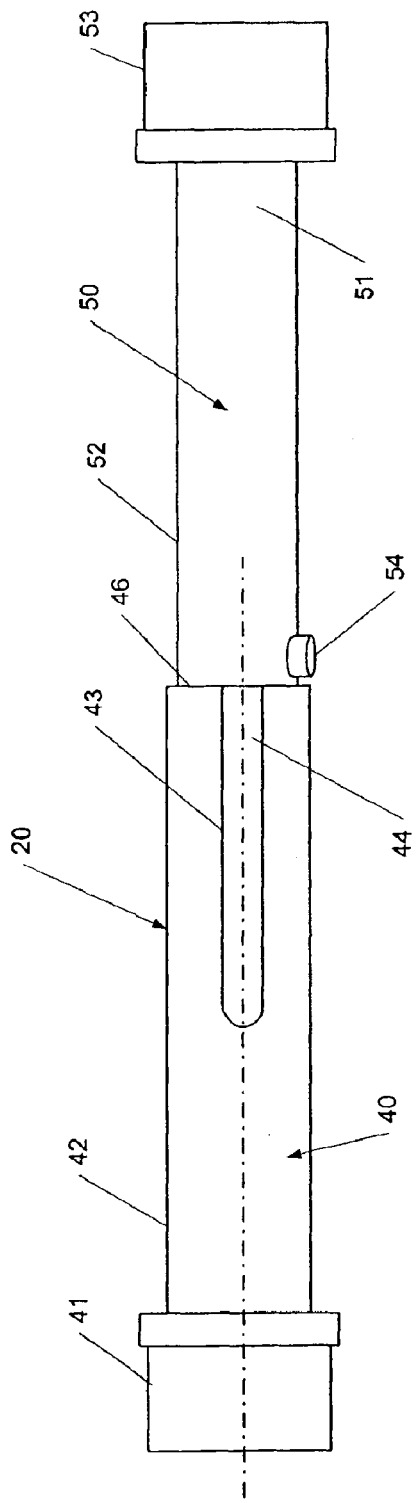
FIG. 4 is a plan view of the coupled slotted and pegged housings in a non-engaged, ready position.

FIGS. 3–5 provide a detailed view of slotted housing 40 and pegged housing 50. Slotted housing 40 generally comprises an outer housing or end wall 41, an outer sleeve 42 having a slotted wall 43 with an anti-rotation slot 44 being cut longitudinally in the outer sleeve 42 and a retention surface 46 formed at the distal end/edge of the outer sleeve 42 as shown in FIGS. 1 and 2. The outer housing 41, as shown more clearly in FIGS. 3–5, is generally affixed to the closed or proximal end of the outer sleeve 42 in a known manner, such as through bonding, compression fitting, or other suitable adhesion method for affixing the outer housing 41 to the slotted outer sleeve 42.

As further shown in FIGS. 1–5, the pegged housing 50 includes an inner sleeve 51 having a side wall 52, and an end wall/member 53 attached to the leading elbow 30. The pegged housing also includes an anti-rotation pin 54 mounted at an intermediate point along side wall 52. Analogous to the slotted housing 40, as described above, the inner sleeve 51 is adhered to the end wall 53 in any manner, such as by bonding, compression fitting, or any other suitable attaching method.

FIG. 3 further shows the slotted housing 40 and pegged housing 50 in a compressed, engaged mode. In this position, the anti-rotation pin or peg 54 of pegged housing 50 is moved fully along the length of the anti-rotation slot 44 and is lodged at the closed end of slot 44 to place the wheel chock 10 in a secure, engaged position.

FIG. 4 shows the wheel chock 10 in its non-engaged, released or ready position. Here, the anti-rotation pin 54 has been removed from anti-rotation slot 44 by movement of the slotted housing 40 relative to the pegged housing 50 in directions opposite each other. Once the anti-rotation pin 54 has cleared the end of the anti-rotation slot 44, the inner sleeve 51 of the pegged housing 50 is rotated so as to move the anti-rotation pin out of alignment with the slot 44 and into a position to thereafter engage and become held by retention surface 46 to thus lock the pegged and slotted housings in an extended, ready configuration.

In operation and as shown with reference to FIGS. 1–5, either the slotted housing 40 or the pegged housing 50, or both, is/are pulled in an opposite direction to the other to move the anti-rotation pin 54 beyond the length of the anti-rotation slot 44. The pegged and/or slotted housings of the wheel chock 10 is/are then rotated in such a manner to lodge the anti-rotation pin 54 against the retention surface 46 of the outer sleeve 42 of the slotted housing 40. The engagement of the pin 54 against the retention surface 46 retains the wheel chock 10 in an extended, non-engaging position or ready mode until use. The wheel chock is then placed about the wheel of the aircraft, with its leading and tailing stop braces 31 and 35 positioned in front of and behind the wheel as shown in FIGS. 1 and 2. Thereafter, the uncoupled components are released by rotating inner sleeve 51, which carries the anti-rotation pin 54 back into alignment with the anti-rotation slot 44 to enable the compressive force applied between the outer sleeve 42 and the inner sleeve 51 by the tension element 21 to urge or pull the two housings together and into engagement with the airplane wheel 15 (FIG. 1). The re-alignment can occur in either direction as long as the rotation ends with the anti-rotation pin 54 coming into alignment with the anti-rotation slot 44. To further provide ease of use, the extension pull 39 or rigid placement/removal arm 1239 can be used to pull or urge the slotted housing 40 away from the pegged housing 50 as needed to release the airplane wheel 15. As the aircraft is subsequently subjected to buffeting by winds and jet/prop wash, the engagement of the wheel will urge the wheel chock against the ground to resist shifting or other movement of the aircraft wheel.

Figure 7:
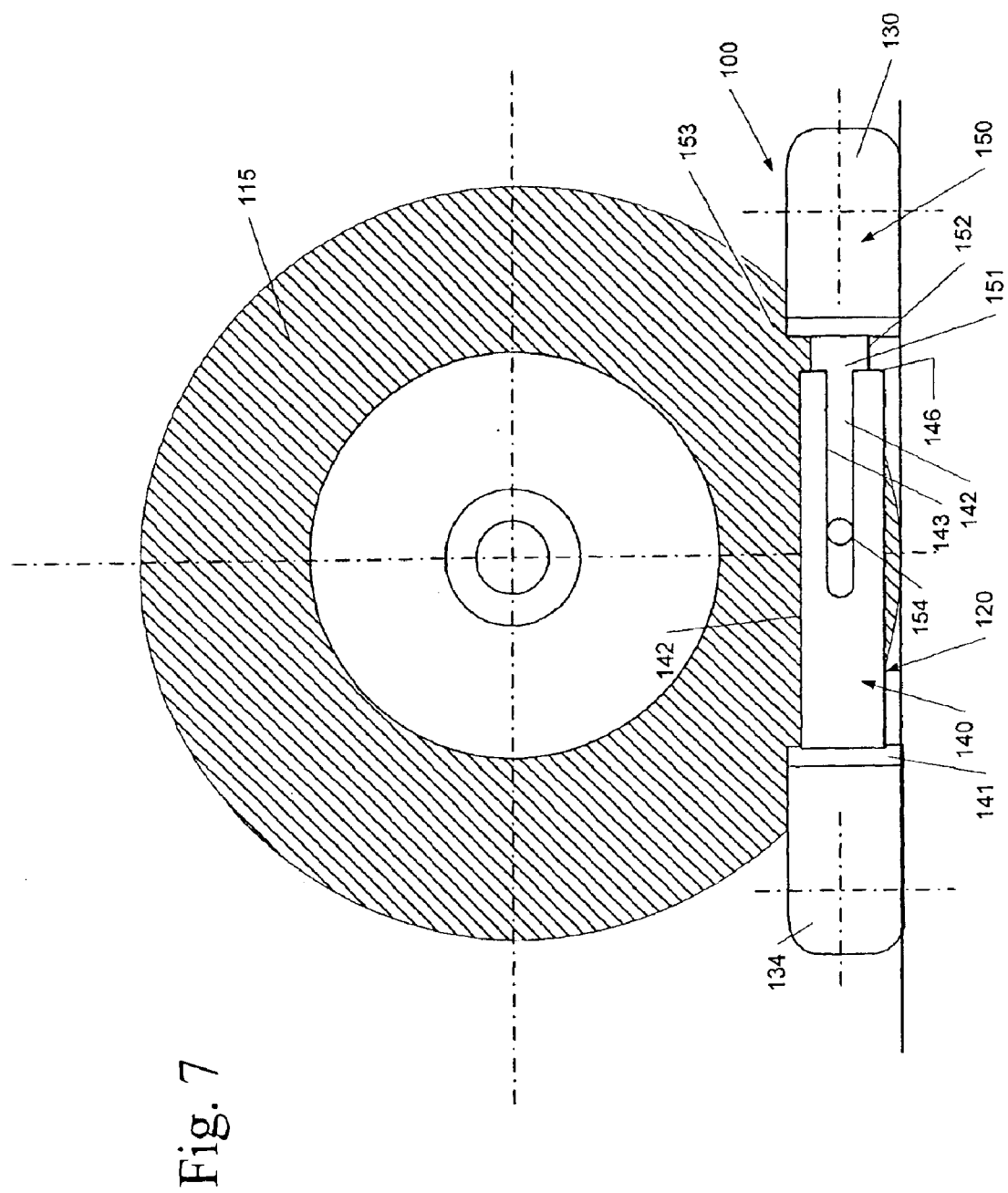
FIG. 7 is a side elevational view of an alternate embodiment of the wheel chock in the engaged position.
Figure 8:
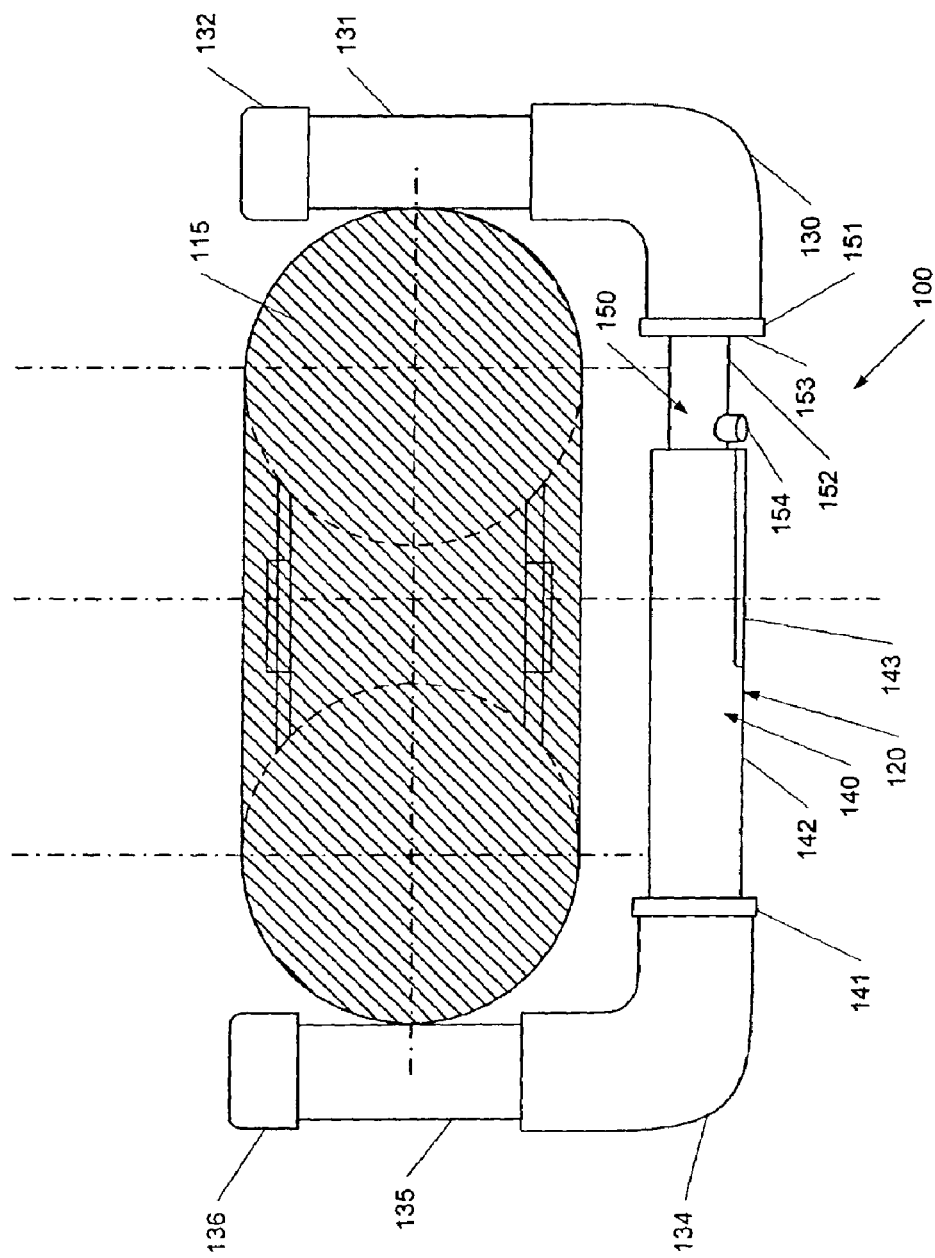
FIG. 8 is a plan view of the wheel chock of the embodiment of FIG. 7 in the ready position.
Figure 10:
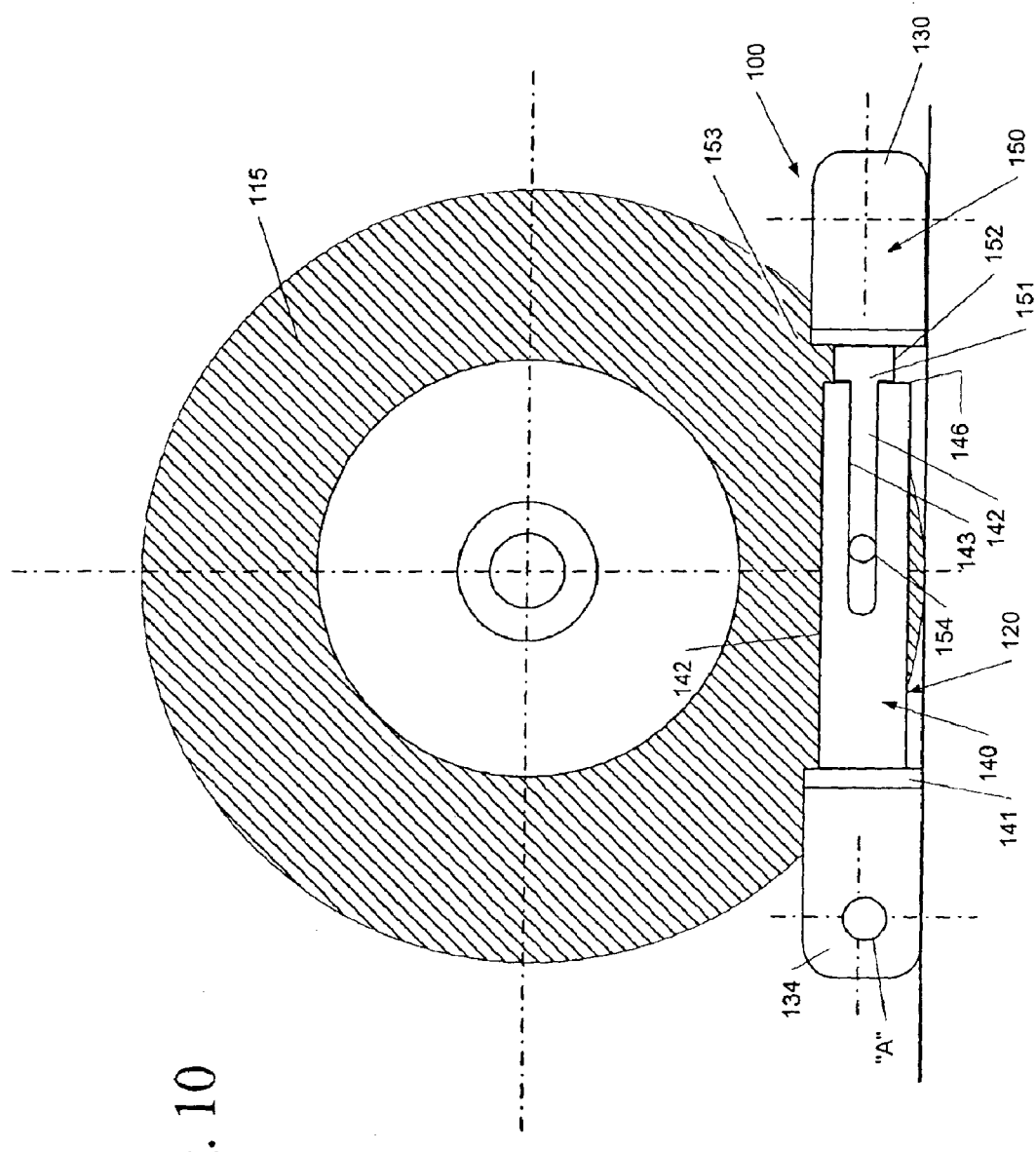
FIG. 10 is a side elevation view of an alternate embodiment of the wheel chock in the engaged position.
Figure 11:
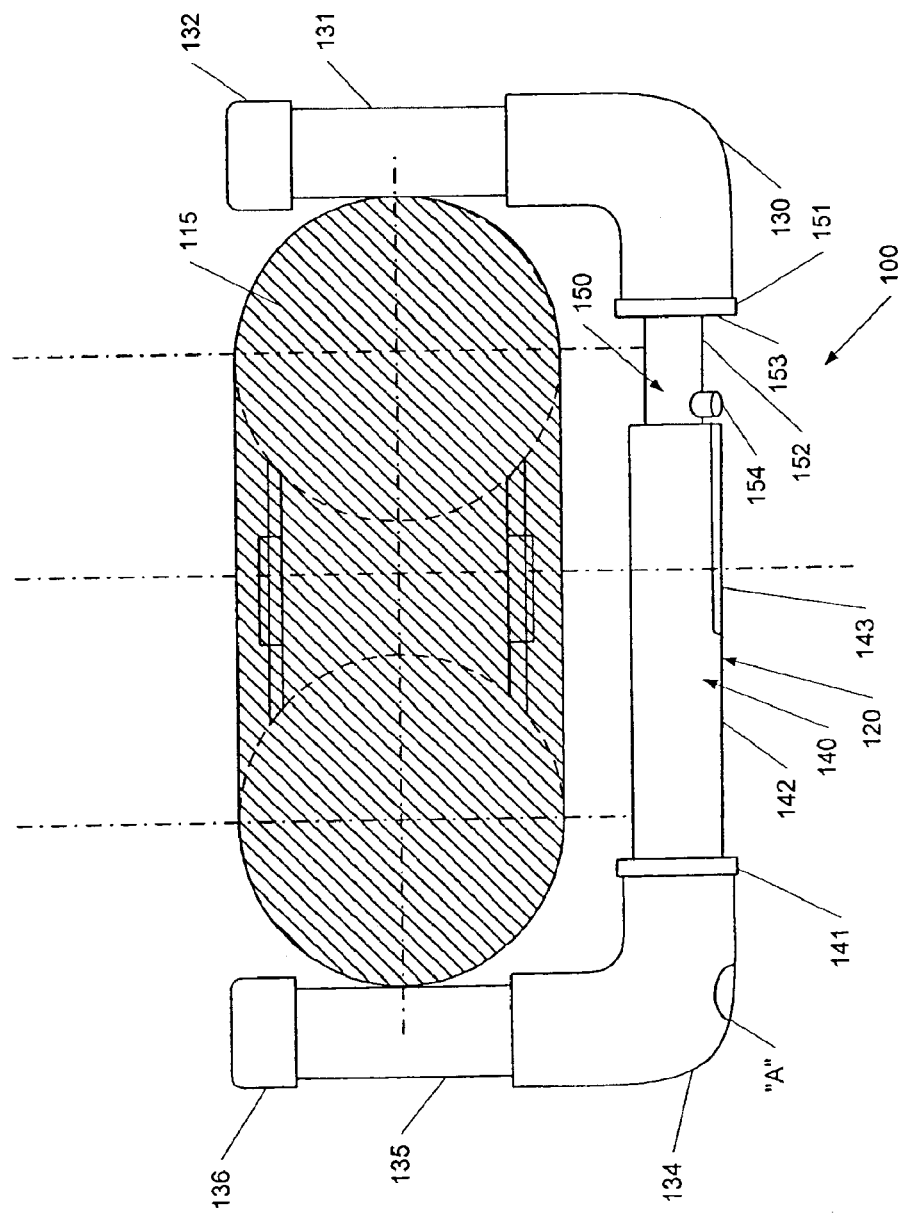
FIG. 11 is a plan view of the wheel chock of the alternate embodiment of FIG. 10 in the ready position.

FIGS. 7 and 8 show an alternative embodiment of the wheel chock 100 for a wheel 115. As shown in FIGS. 7 and 8, wheel chock 100 includes many of the same or similar elements as wheel chock 10, including a leading elbow 130, a leading stop brace 131, a leading end cap 132, a trailing stop brace 135, and a trailing end cap 136. However, the wheel chock 100 includes a trailing elbow 134 in place of the T-extension 33 of the wheel chock 10. The trailing elbow 134 generally is coupled to the trailing stop brace 135 and is affixed to a slotted connector outer sleeve 141. FIGS. 7 and 8 show a locking sub-assembly 120 that generally includes a slotted housing 140 and a pegged housing 150, slidingly coupled together under the biasing influence of a tension element (not shown). The slotted housing 140 includes an end cap attached to trailing elbow 134 of the trailing stop brace 135 and/or outer sleeve 142 having a slotted wall 143. Pegged housing 150 includes an inner sleeve 151 having a side wall 152 and an end wall/member 153 attached to leading elbow 131. The pegged housing 150 also includes an anti-rotation pin 154 mounted at an intermediate point along side wall 152.

Figure 9:
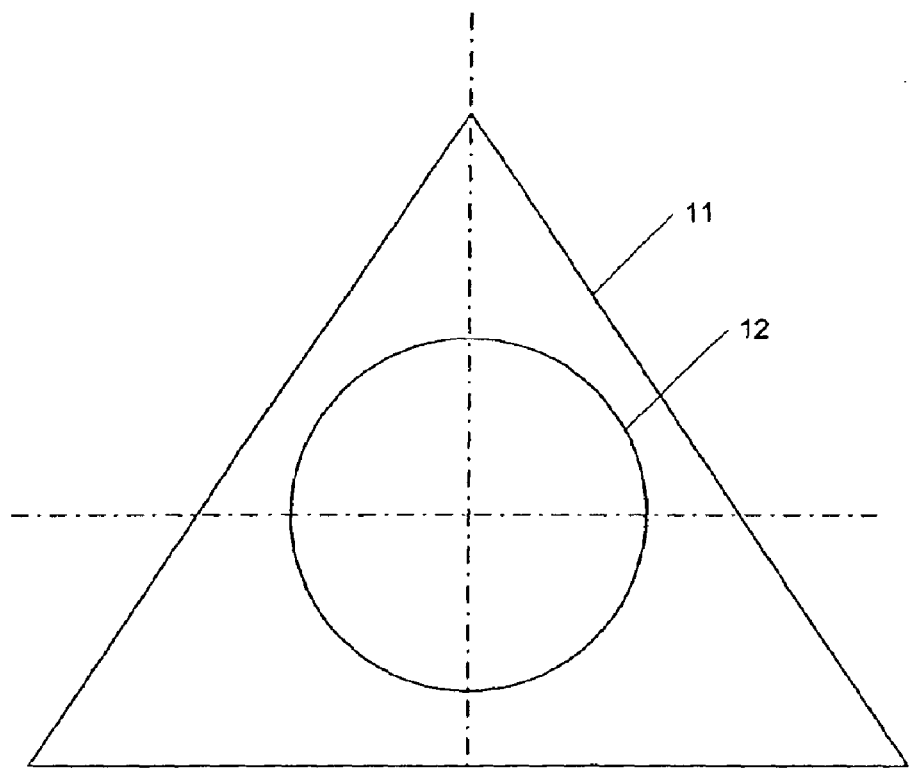
FIG. 9 is an end view of an optional wedge element that can be positioned over the stop braces for extended wheel retention.

As an additional safety precaution, wheel chock 10 wheel chock 100, or wheel chock 210 also can be augmented through the positioning of a wedge-shaped blocker 11 over the leading stop brace and trailing stop brace. As shown in a detailed view in FIG. 9, the wedge-shaped blocker assembly generally is a substantially triangularly or wedge shaped block that includes a hole 12, which permits attachment to either the leading stop brace or trailing stop brace. Other shapes or configurations also can be used. The coupled wedge blocker will augment retention of the aircraft wheel 15 by increasing the surface contact area between the tire and the ground.

Figure 13:
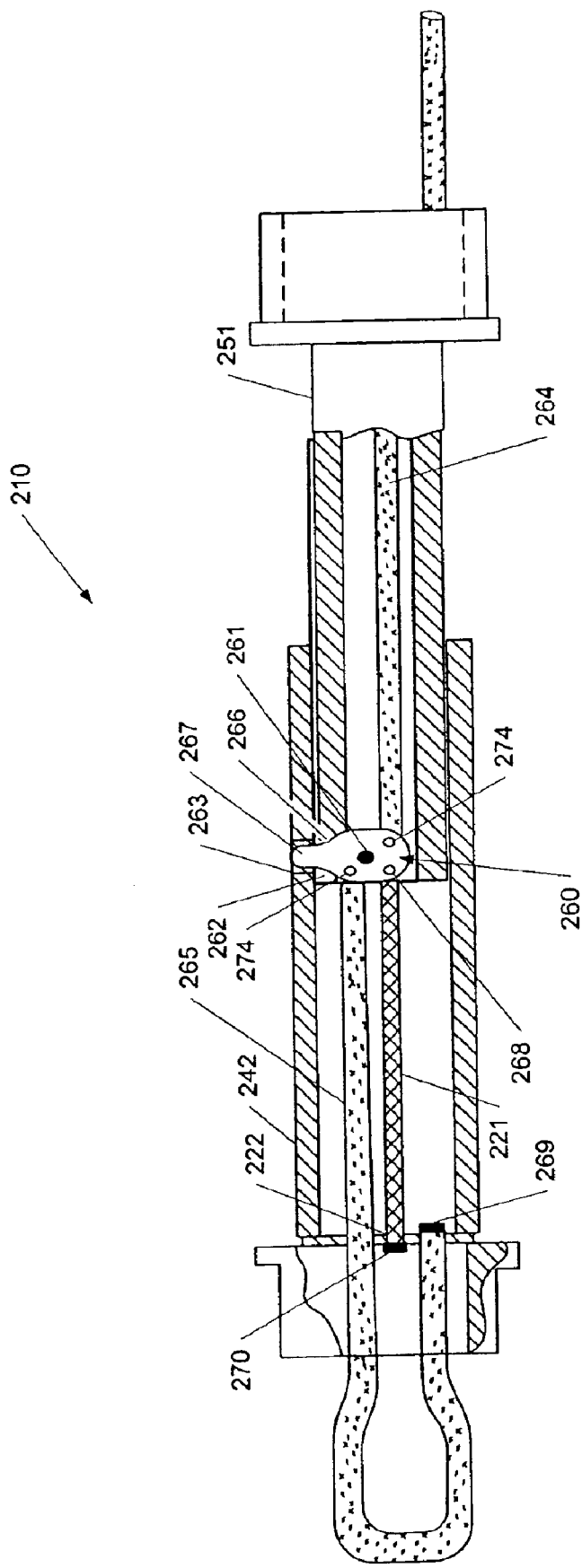
FIG. 13 is a cross-sectional view of an alternate embodiment of the wheel chock with pull ropes to engage and disengage the wheel chock.
Figure 15:
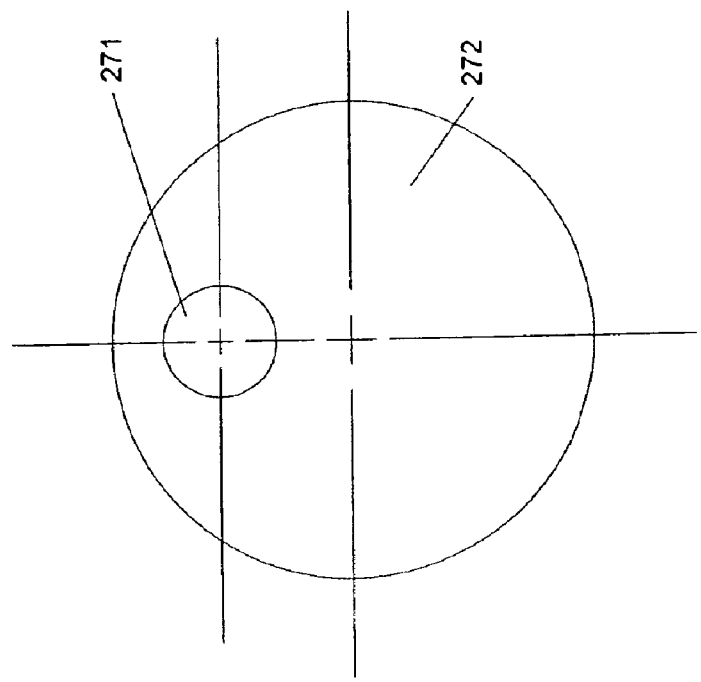
FIGS. 14 and 15 are end views of example tension mounts for anchoring the tension elements of the embodiment of FIG. 13.
Figure 14:
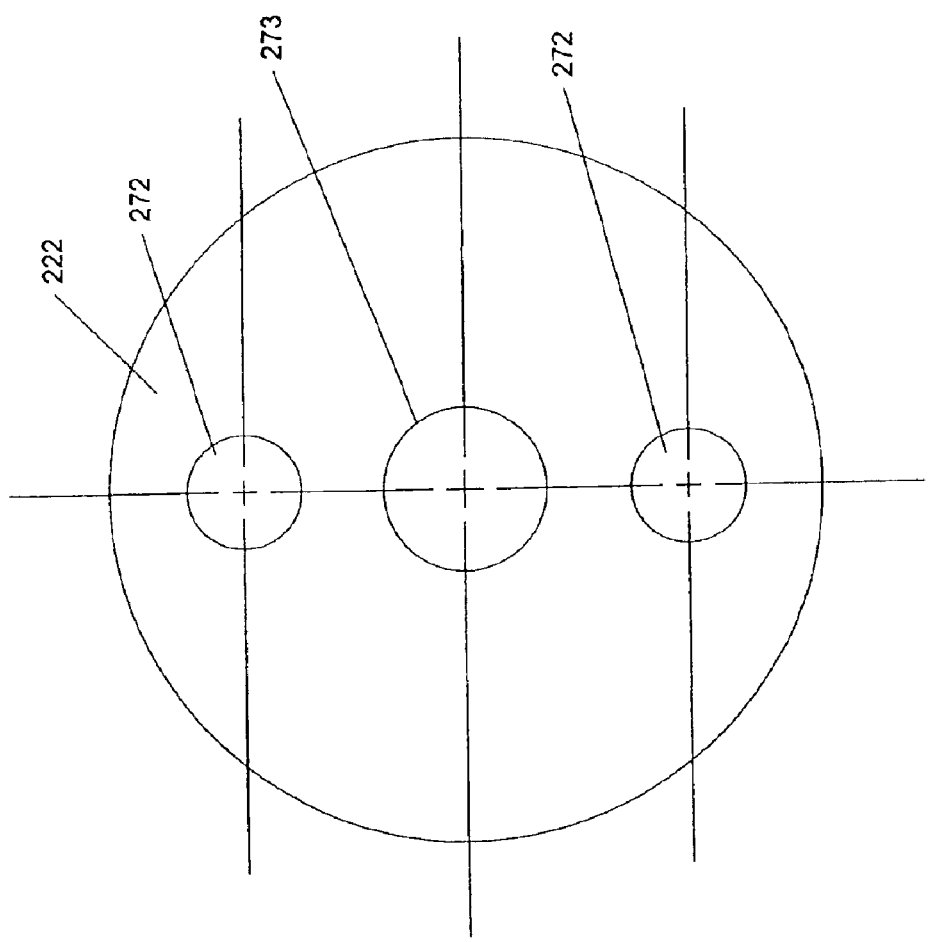

In an alternate embodiment, a release mechanism is provided for engaging or disengaging the wheel chock. As shown in FIGS. 13–15, the release mechanism replaces the pin-slot design detailed above with a pivoting tension element.

FIG. 13 shows a wheel chock 210 with a tension element 221 attached to a latch mechanism 260 by a stud, rivet, pin, bolt, or similar attachment mechanism 268. The latch mechanism 260 includes a latch element 267 that can be inserted into a latch slot 262 formed in an inner sleeve 251 and can further be inserted into a latch opening 263 formed in outer sleeve 242. The latch mechanism 260 can pivot about a pivot pin 261 to move the latch element 267 into an extended position projecting into the latch slot 262 and/or the latch opening 263. When in its extended position, the latch element 267 of the latch mechanism 260 is held against a latch stop 266 formed toward the end of the inner sleeve 251 under the influence of a pulling forces exerted thereon by the tension element 221. Additionally, in the extended position, the outer sleeve 242 is held in position by engagement of the latch element 267 within the latch opening 263.

In order to operate the release mechanism of the present embodiment, the latch mechanism 260 is rotated about the pivot pin 261 by pulling either an inner sleeve pull 264 or an outer sleeve pull 265. The rotation of the pivot pin 261 pivots the latch element 267 downward to release the latch element from the latch opening 263. Once released, the wheel chock 210 is free to constrict or retract into engagement with the wheel to secure the wheel.

In an engaged position about a wheel, the tension element 221 generally has one end attached to the latch mechanism 260, while the other end is threaded through an outer sleeve header 222 and held in place with an anchor 270. Although the outer sleeve header 222 can provide any number of additional holes through which the outer sleeve pull 265 can be threaded and/or secured, as shown in FIGS. 13 and 14, the outer sleeve header 222 generally includes two holes 272, 273, one hole 272 providing a guide for the outer sleeve pull 265, which is threaded therethrough, while the other hole 273 receives an end of the outer sleeve pull 265 therethrough, which end is secured with an anchor 269 that will bear against the outer sleeve header as shown in FIG. 13. The inner sleeve pull 264 and the outer sleeve pull 265 are shown in FIG. 13 attached to the latch mechanism 260 by attachment mechanism 274, but could be held in position by any securing method.

As shown in FIG. 15, the inner sleeve 251 generally includes an inner sleeve header 271. The inner sleeve header 271 can include any number of holes as necessary for guidance or retention of the pulls 264/265 therein, but here is shown for illustration with only one hole 275 to secure the inner sleeve pull 264. The wheel chock 210 can be removed from the engaged position by pulling either the inner sleeve pull 264 or the outer sleeve pull 265, or both, in a direction opposite the other or each other. The inner sleeve pull 264 or the outer sleeve pull 265 can constitute any form of pull capable of engaging and/or disengaging the wheel chock 210; including a rope, band, bar, extension handle, or the like.

Figure 16:
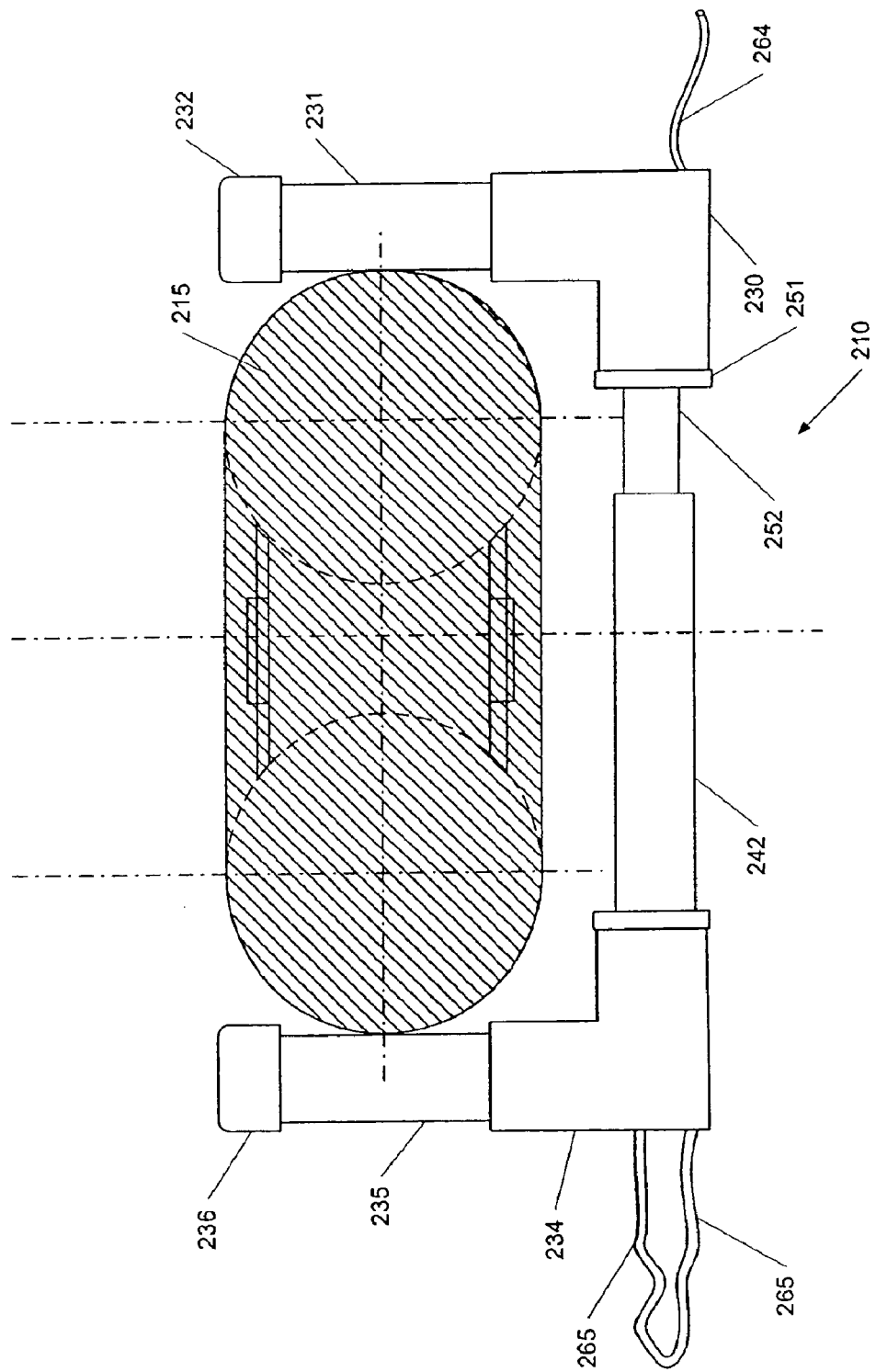
FIG. 16 is a plan view of the wheel chock of the alternate embodiment of FIG. 13 in the ready position

FIG. 16 shows the alternate embodiment of FIGS. 13–15 in plan view and in the ready position. Wheel chock 210 is shown around wheel 215 and includes inner sleeve 251 and outer sleeve 242. The outer sleeve 242 is shown attached to a trailing stop brace 235 through trailing connector 234 and the inner sleeve 251 is shown attached to a leading stop brace 231 through a leading connector 230. The trailing stop brace 235 can end with a connection to a trailing end cap 236 and the leading stop brace 231 can end with a connection to a leading end cap 232. The inner sleeve pull 264 extends out of the inner sleeve 251 and the outer sleeve pull 265 extends out of the outer sleeve 242.

The embodiment described in FIGS. 13–16 can be used in any of the above described orientations as an option to the pin/slot design. Either design will function equally well to enable the wheel chock to be placed or removed for securing a wheel.

In the embodiments described above, the wheel chock components generally are constructed of a rigid, durable material, such as plastic, aluminum or other, similar material that is both lightweight and resistant to corrosion. Such versatility will permit the wheel chock to be lightweight to provide an ease of use feature to the pilot or user and yet provide a secure and reliable means of maintaining and stabilizing parked vehicles such as light aircraft from buffeting or movement due to wind or the backwash from other aircraft.

The wheel chocks as described could include a number of additional features or modifications to the above described features. For example, in lieu of permanently affixing the outer sleeve and inner sleeve, respectively, to their end walls, these connections could be made removable for replacement of the tension element if necessary, such as for repair, replacement, cleaning, to accommodate storage of the wheel chock in a small compartment, and/or for any other reason. Additionally, the wheel chocks provided could be used in any vehicle where wheel retention was desired.

The terms leading and trailing have been used throughout this disclosure for consistency, but are not intended to restrict the wheel chock to a specific use or orientation, for example, the leading edge could be used against the side of the wheel facing the rear of the aircraft.

The foregoing description of various embodiments has been presented for the purposes of illustration and description and is not intended to be exhaustive or limited to the precise form disclosed. Many modifications and variations are possible in light of the above teaching, without departing from the spirit and scope of the invention as set forth in the following claims.

What is claimed is:

1. A wheel chock adapted to be mountable about a vehicle wheel for securing the vehicle comprising:
    a first housing having a slot extending therealong;
    a second housing including a pin mounted along an intermediate portion thereof;
    a leading brace and a trailing brace for securing the vehicle wheel; and,
    a tension element engaging and urging said first and second housings from an extended, nonengaging position toward a compressed engaging position place said leading and trailing braces in engagement with the vechicle wheel and wherein while the pin is received in the slot, the pin travels in the slot between the nonengaging and engaging positions.

2. The wheel chock of claim 1, and further comprising, a leading elbow connecting said leading brace to said second housing and a trailing elbow connecting said trailing brace to said first housing.

3. The wheel chock of claim 2, wherein said leading brace includes a leading end cap and said trailing brace includes a trailing end cap.

4. The wheel chock of claim 1, and further comprising, a leading elbow connecting and further comprising said leading brace to said second housing and a T-extension connecting said trailing brace to the first housing.

5. The wheel chock of claim 4, wherein said T-extension further includes an extension member.

6. The wheel chock of claim 5 and further comprising an extension pull extending from said T-extension.

7. The wheel chock of claim 6 wherein said extension pull enables said first housing to be pulled away from said second housing to move said pin along said slot.

8. The wheel chock of claim 1, wherein said tension element comprises an elastic member having spaced ends each held by a tension mount.

9. The wheel chock of claim 1, wherein said first and second housings are held in their extended position by engagement of said pin with a retention surface of said first housing.

10. The wheel chock of claim 1, wherein said slot retards rotation of said pin when said pin is resident within said slot.

11. A method of securing a wheel of a vehicle with a wheel chock, the wheel chock including a housing having a slot extending therealong, a second housing including a peg mounted along an intermediate portion thereof, a leading brace and a trailing brace for securing the wheel of the vehicle, and a tension element for urging said first and second housings from an extended, nonengaging position to a compressed, engaging position with said peg received in said slot to secure the wheel, the method comprising:
  placing the wheel chock in its extended, non-engaging position;
  positioning the wheel chock in a straddling position about a portion of the wheel of the vehicle;
  rotating the peg of the pegged housing of the wheel chock into a position to be received within the slot of the slotted housing; and,
  moving the peg along the slot, while the peg is received in the slot, to place the leading and tailing braces into engagement with the vehicle wheel.

12. The method of claim 11 and further comprising:
  returning the wheel chock to its extended, non-engaging position by moving the peg out of the slot.

13. The method of claim 12, wherein the peg is retained by a retention surface after breaching the slot.

14. The method of claim 12 wherein returning the wheel chock to its non-engaging position includes pulling an extension pull connected by a T-extension to the slotted housing so as to move the slotted housing with respect to the pegged housing.

15. A wheel chock adapted to be mountable about a vehicle wheel for securing the vehicle comprising:
  a first housing having an opening;
  a second housing having a latch;
  a leading brace and a trailing brace for securing the vehicle wheel; and,
  a tension element engaging and urging said first and second housings from an extended, nonengaging position toward a compressed, engaging position to place said leading and trailing braces in engagement with the vehicle wheel, and wherein while the latch is received in the opening, the latch travels in the opening between the nonengaging and engaging positions.

16. The wheel chock of claim 15 and further comprising an extension pull extending from said first housing.

17. The wheel chock of claim 16 wherein said extension pull enables said first housing to be pulled away from said second housing to move said latch out of said opening.

18. The wheel chock of claim 15, wherein said tension element comprises an elastic member having spaced ends each held by a tension mount.

19. A method of securing a wheel of a vehicle with a wheel chock, the wheel chock including a housing having a slot extending therealong, a second housing including a peg mounted along an intermediate portion thereof, a leading brace and a trailing brace for securing the wheel of the vehicle, and a tension element for urging said first and second housings from an extended, nonengaging position to a compressed, engaging position with said peg received in said slot to secure the wheel, the method comprising:
  placing the wheel chock in its extended, non-engaging position;
  positioning the wheel chock in a straddling position about a portion of the wheel of the vehicle;
  rotating the peg of the pegged housing of the wheel chock into a position to be received within the slot of the slotted housing; and,
  moving the peg along and in the slot to place the leading and tailing braces into engagement with the vehicle wheel wherein moving the peg secures the pegged housing against rotation with respect to the slotted housing.

20. The wheel chock of claim 1, wherein the wheel chock can be locked in the extended, nonengaging position.

21. The wheel chock of claim 1, wherein the wheel chock allows one-handed placement and operation.

22. The wheel chock of claim 1, wherein the tension element maintains pressure on the wheet at all times in the engaging position.

23. The wheel chock of claim 1, wherein the pin functions to keep the wheel chock in the nonengaging position end can function to keep the wheel chock in the engaging position.

* * * * *